Aug. 14, 1956 C. W. SINCLAIR 2,758,678
SELF ENERGIZING BRAKE
Filed Feb. 8, 1952 5 Sheets-Sheet 1
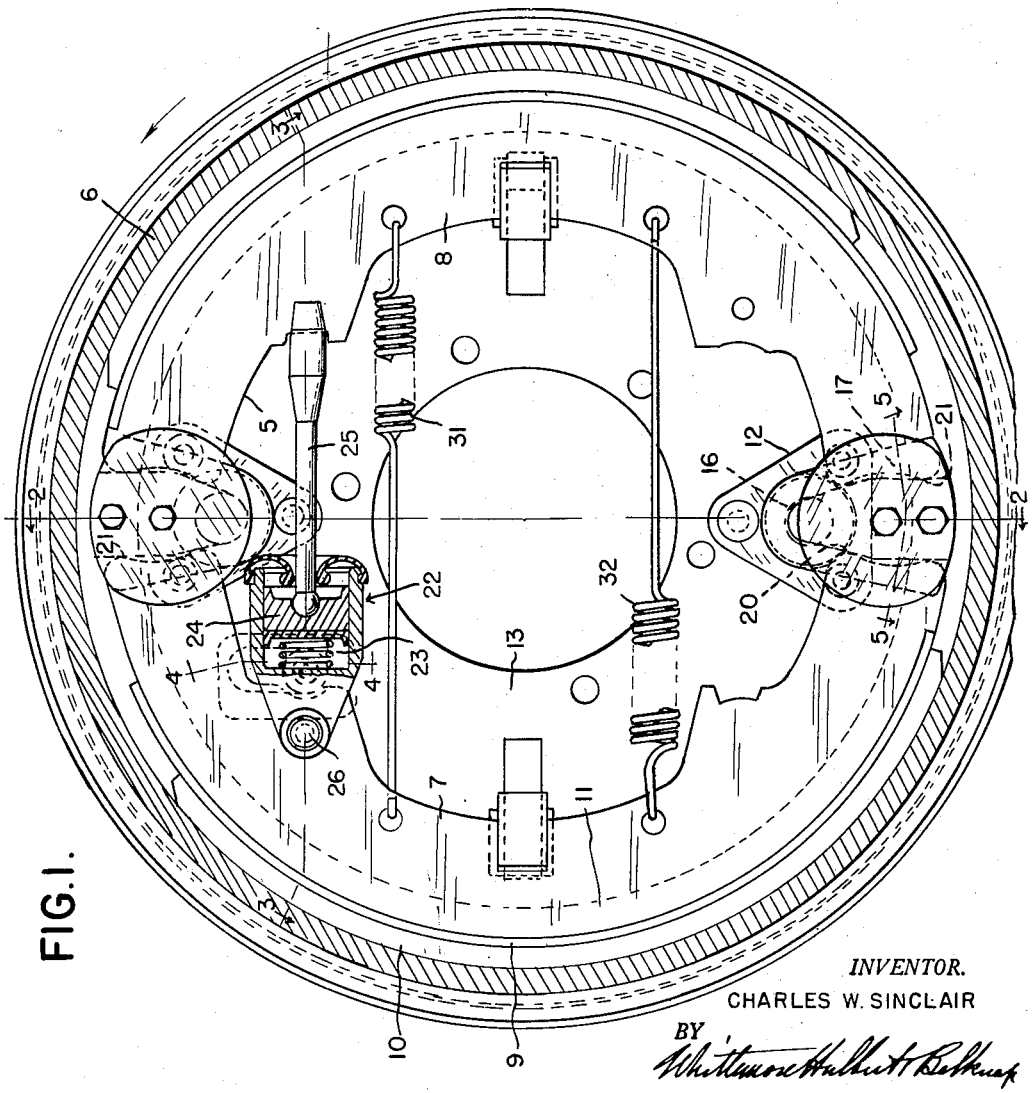
INVENTOR.
CHARLES W. SINCLAIR
BY
ATTORNEYS Aug. 14, 1956
C. W. SINCLAIR
2,758,678
SELF ENERGIZING BRAKE
Filed Feb. 8, 1952
5 Sheets-Sheet 2
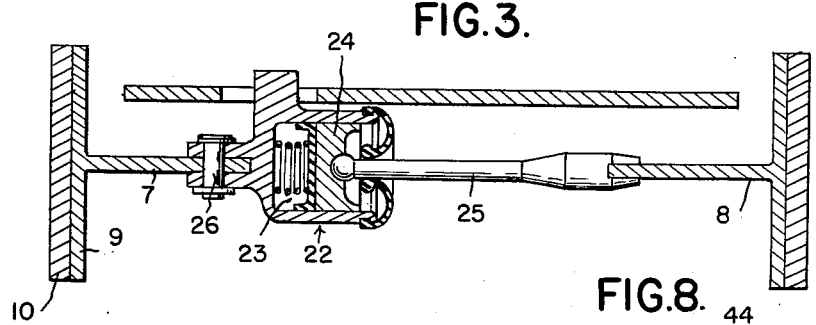
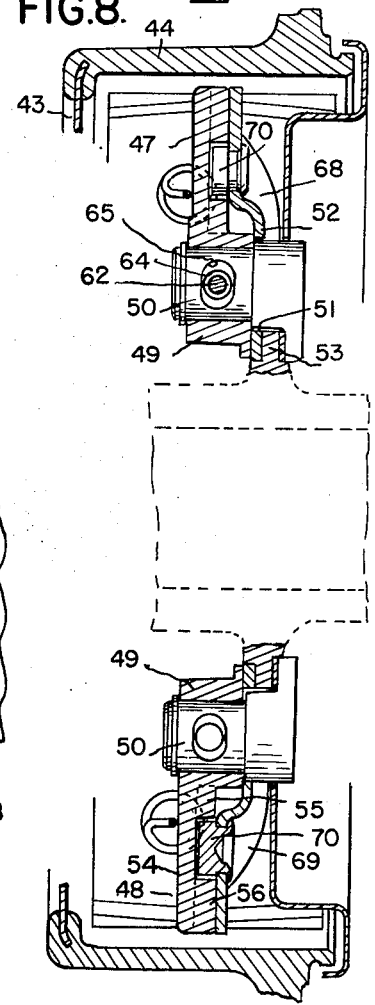
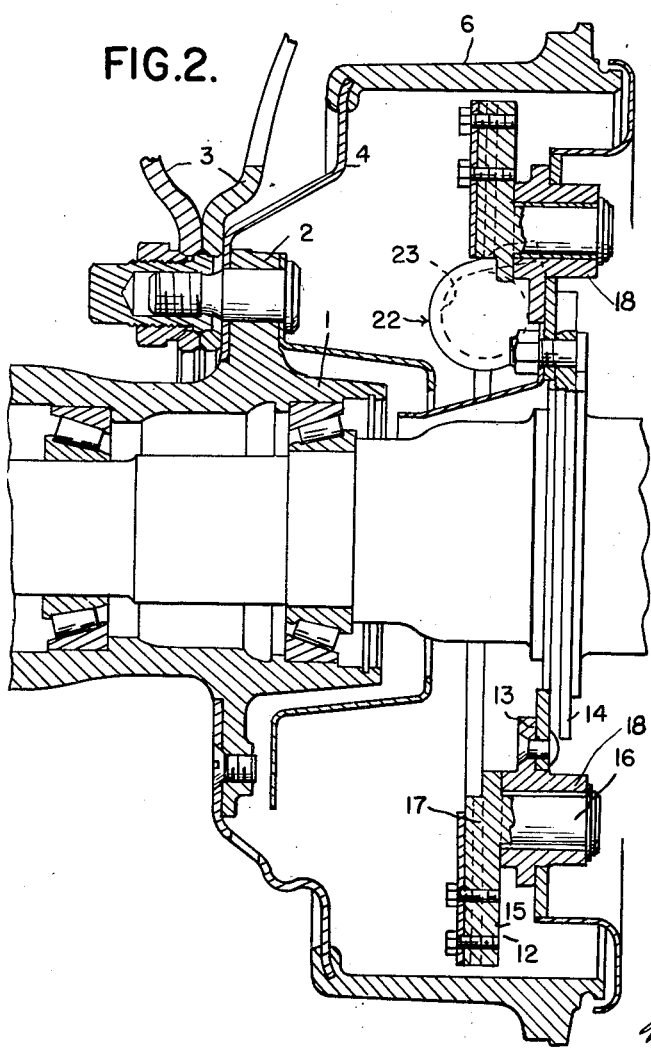
INVENTOR.
CHARLES W. SINCLAIR
BY
*Whittemore Hulbert & Belknap*
ATTORNEYS Aug. 14, 1956  C. W. SINCLAIR  2,758,678
SELF ENERGIZING BRAKE
Filed Feb. 8, 1952  5 Sheets-Sheet 3

*INVENTOR.*
CHARLES W. SINCLAIR
BY
ATTORNEYS

Aug. 14, 1956

C. W. SINCLAIR 2,758,678

SELF ENERGIZING BRAKE

Filed Feb. 8, 1952

INVENTOR.
CHARLES W. SINCLAIR
BY

ATTORNEYS

Aug. 14, 1956     C. W. SINCLAIR     2,758,678
SELF ENERGIZING BRAKE
Filed Feb. 8, 1952     5 Sheets-Sheet 5
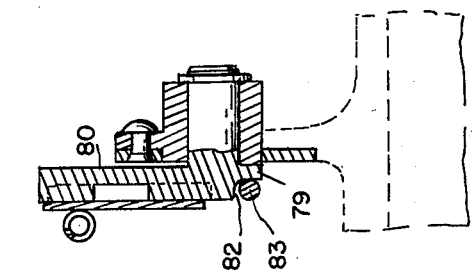
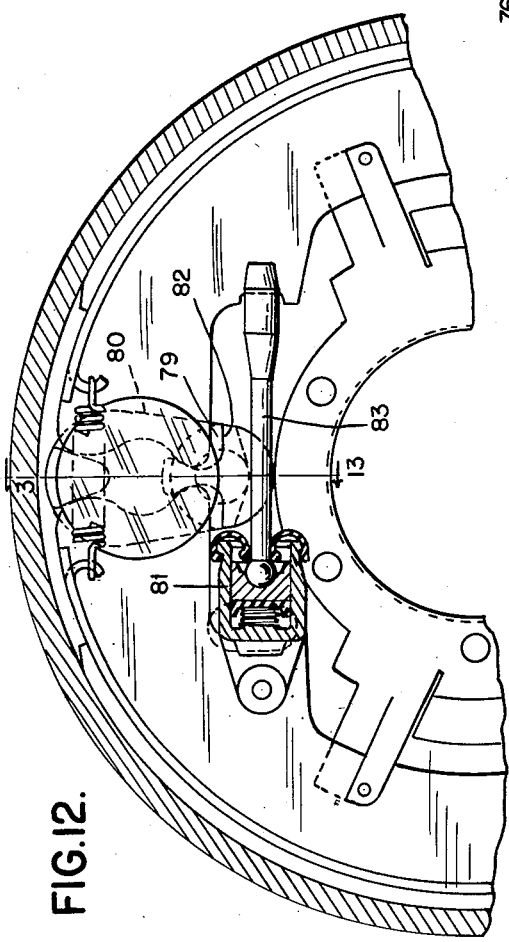
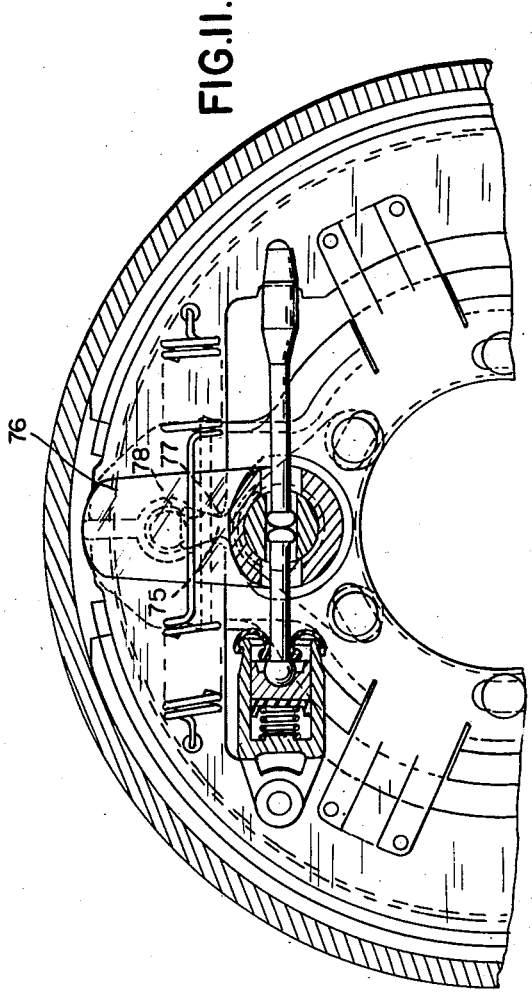
INVENTOR.
CHARLES W. SINCLAIR
BY
ATTORNEYS United States Patent Office 2,758,678
Patented Aug. 14, 1956

2,758,678

SELF ENERGIZING BRAKE

Charles W. Sinclair, Detroit, Mich., assignor to Kelsey-Hayes Wheel Company, Detroit, Mich., a corporation of Delaware Application February 8, 1952, Serial No. 270,677

5 Claims. (Cl. 188—78)

The invention relates to brakes and refers more particularly to vehicle wheel brakes of the type employing brake drums.

The invention has for one of its objects to provide a brake which requires relatively low pressure for operation and yet is powerful.

The invention has for another object to provide a brake having a friction device within a brake drum provided with adjacent ends which are adapted to be spaced apart to engage the friction device with the drum and also having means for transmitting force from one end to another end and for cooperating with the friction device and drum to anchor the friction device.

The invention has for a further object to provide a brake in which the parts can be compactly arranged to enable use of a brake drum of relatively smaller diameter.

With these and other objects in view the invention resides in the novel features of construction and combinations and arrangements of parts as more fully hereinafter set forth.

In the drawings:

Figure 1 is a side elevation of a brake embodying the invention with the brake drum in section and the wheel to which the brake drum is secured omitted;

Figures 2, 3, 4 and 5 are cross sections on the lines 2—2, 3—3, 4—4, and 5—5 respectively of Figure 1;

Figure 9:
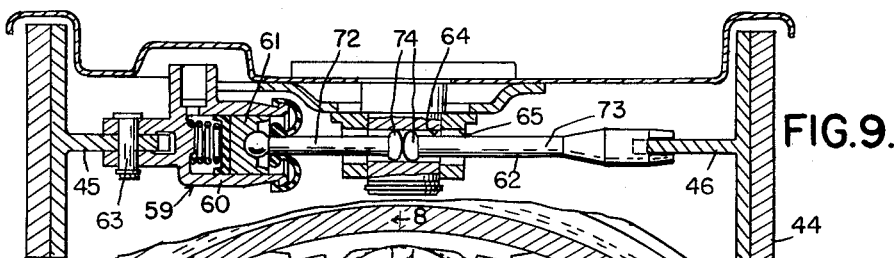
Figure 7:
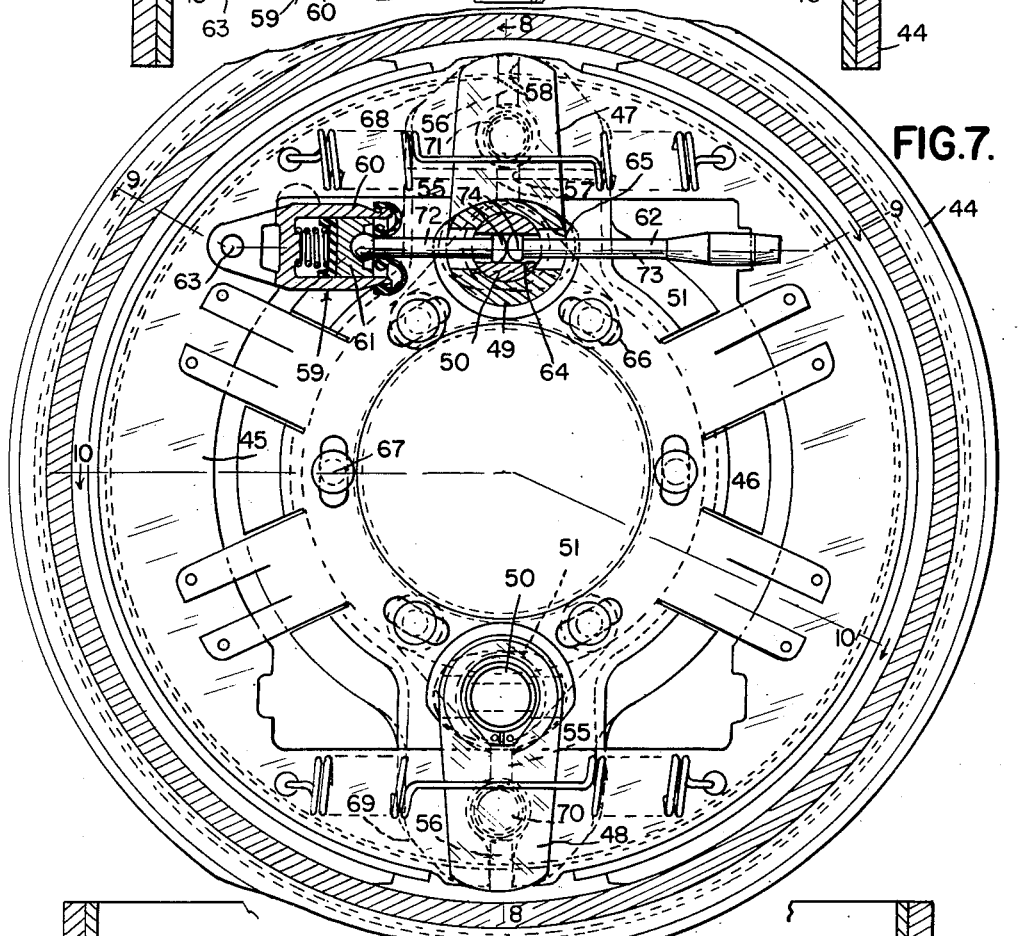
Figure 7 is a view similar to a portion of Figure 1 showing another embodiment of the invention.
Figure 10:
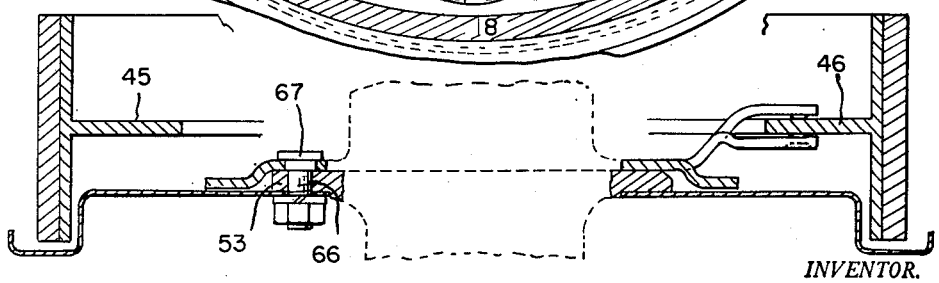

Figures 8, 9 and 10 are cross sections on the lines 8—8, 9—9 and 10—10 of Figure 7;

Figures 11 and 12 are views similar to Figure 1 showing other embodiments of the invention; and Figure 13 is a cross section on the line 13—13 of Figure 12.

The brake illustrated in Figures 1, 2, 3, 4, and 5 is designed for use with a vehicle wheel and more particularly a motor vehicle wheel having the hub 1 provided with the fixed radial flange 2 upon which are detachably mounted the wheel bodies 3.

The brake comprises the brake drum 4 permanently mounted upon the fixed radial flange 2 and the friction device 5 within the drum and engageable with the radially inner surface of its annular brake flange 6. The friction device comprises the pair of friction elements or brake shoes 7 and 8, which are alike and of T cross section and have the arcuate flange or table 9 to which the brake lining 10 is secured and the radial flange or web 11 extending radially inwardly from the arcuate flange or table. The shoes have spaced adjacent ends between which are located the force transmitting members 12 for transmitting in each instance force from one of the adjacent ends to the other of the adjacent ends. Each force transmitting member 12 is in the nature of a lever extending between and engaging adjacent ends of the shoes and movable radially inwardly of its points of engagement with the shoes on a mounting. The mounting in the present instance is the backing plate 13 fixedly secured to the fixed radial flange 14 of the axle housing of the motor vehicle. More particularly, each force transmitting member 12 has the plate-like body 15, the integral transverse pivot pin 16 at one end and the integral transverse longitudinally extending projection or cam 17 at the side opposite the pin and of less width than the body. The backing plate has fixedly secured thereto the brackets 18 in which are journalled the pivot pins 16. The edges of the projection or cam 17 of each force transmitting member are engageable with the ends of the shoes radially outwardly of the axes of the pivot pins. Each force transmitting member has the plate 19 fixedly secured thereto and against the projection or cam and this plate and the portions of the body 15 beyond the projection or cam guide the ends of the shoes.

For the purpose of transmitting a part only of the force generated in one shoe to another shoe, the adjacent ends of the radial flanges or webs of the shoes are formed with the rounded or convex radially inner and outer bearings 20 and 21 engageable with the edges of the extensions or cams 17 at different radial distances from the axes of the pivot pins 16. The construction is such that upon application of the shoes to the drum during rotation of the latter, the radially inner bearings 20 at the trailing ends of the shoes operate to swing the force transmitting members 12 about the axes of the pivot pins 16 and these force transmitting members operate upon the radially outer bearings 21 at the leading ends of the shoes to force the shoes against the drum.

For the purpose of applying the shoes to the brake flange of the drum, I have provided the actuating device 22 which in the present instance is a wheel cylinder having the cylinder 23, the piston 24 reciprocable within the cylinder and the piston rod 25. The actuator is separate from the force transmitting members and extends chordwise of the brake, the cylinder 23 being pivotally mounted on and carried by the shoe 7 by means of the pivot pin 26, and the piston rod 25 having a universal bearing at one end upon the piston 24 and being bifurcated at the other end to embrace the shoe 8. The rod preferably has the concave bearing 27 at the end of the slot between the furcations for engaging a correspondingly shaped surface on the shoe 8. The wheel cylinder is provided with the port 28 for the passage of braking fluid into and from the wheel cylinder, the port being connected to the usual master cylinder. The cylinder is also provided with the bleed port 29 which is normally closed by the plug 30. 31 and 32 are coil springs for retracting the shoes and holding the same in retracted position with their ends against the force transmitting members which extend radially.

With the construction as above described, it will be seen that upon the passage of braking fluid under pressure through the port 28 into the cylinder 23 the end portions of the shoes 7 and 8 to which the wheel cylinder is connected will be spread apart and against the brake flange 6 of the drum. With the drum rotating in a counterclockwise direction as shown by the arrow in Figure 1, the shoe 7 wraps into engagement with the brake flange and moves in a counterclockwise direction with the brake flange so that the initial applying force plus the wrapping force acting through the bearing 20 at the trailing end of the shoe 7 swings the force transmitting member 12 in a counterclockwise direction about the axis of its pivot pin and this force transmitting member operates upon the bearing 21 at the leading end of the shoe 8 to move the latter against the brake flange. The shoe 8 then moves in a counterclockwise direction and some of the applying force and the torque resulting from the engagement of this shoe with the brake flange is then transmitted through the bearing 20 at the trailing end of the shoe to the force transmitting member 12 at the side of the brake occupied by the actuator. As a result the latter force transmitting member is swung in a counterclockwise direction about the axis of its pivot pin and operates through the bearing 21 upon the shoe 7 to add an increased pressure urging the latter shoe more firmly against the brake flange. The adding of force resulting from torque continues until the force transmitting members can no longer swing about the axes of their pivot pins at which time the force transmitting members serve to anchor the friction elements. In other words, during the application of the brake the force transmitting members cooperate with the drum and shoes to anchor the shoes as soon as swinging of the force transmitting members ceases.

Figure 6:
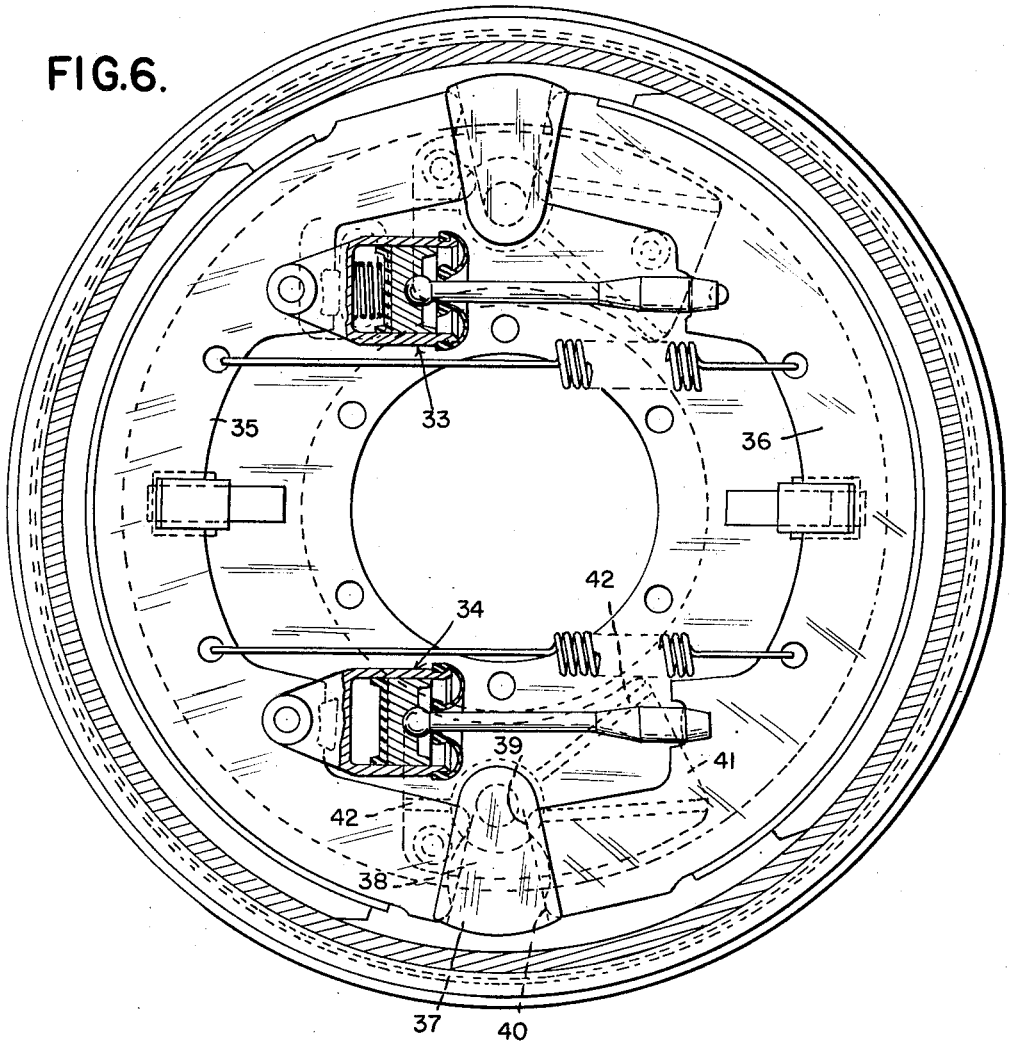
Figure 6 is a view similar to Figure 1 showing another embodiment of the invention.

Figure 6 illustrates a brake employing two wheel cylinders 33 and 34 for spreading apart the ends of the friction elements or brake shoes 35 and 36. The construction of brake including the drum, the brake shoes and each of the wheel cylinders is substantially the same as that of Figures 1–5 inclusive. The force transmitting members 37 which extend between and engage the ends of the shoes are substantially the same as the force transmitting members 12 with the exception that the edges of the projections or cams 38 for engaging both the radially inner and outer bearings 39 and 40 at the ends of the shoes converge radially inwardly sufficiently to eliminate any tendency of the force transmitting members wedging the shoes radially outwardly against the brake flange of the drum. Still another exception is in the construction of the brackets 41 in which the pivot pins of the force transmitting members are journalled. The flanges of these brackets which are secured to the backing plate are enlarged and they are also reinforced by the transverse ribs 42.

The brake illustrated in Figures 7, 8, 9 and 10 comprises the brake drum 43 having the annular brake flange 44, the internal surface of which is adapted to be engaged by the brake linings of the friction elements or brake shoes 45 and 46. The shoes have spaced adjacent upper and lower ends between which are located the force transmitting lever members 47 and 48. Each lever member has the hub 49 at its radially inner end journalled upon the pivot pin 50 which extends transversely through the elongated arcuate opening 51 in the backing plate 52 and is fixedly secured to the fixed radial flange 53 of the axle housing of the motor vehicle. Each lever member also has the plate-like body 54 integral with and extending radially outwardly from the hub 49 and the integral radially spaced transverse projections 55 and 56 engaged in the normal position of the brake parts by the radially inner and outer bearings 57 and 58 respectively upon the adjacent ends of the radial flanges or webs of the shoes.

The actuating device is, in the present instance, the wheel cylinder 59 comprising the cylinder 60, the piston 61 slidable within the cylinder and the piston rod element 62. The cylinder is pivotally mounted upon the upper end portion of the shoe 45 by means of the pivot pin 63 while the rod element extends between the piston 61 and the upper end portion of the shoe 46. The brake drum is of smaller diameter than that illustrated in Figures 1–5 inclusive and the pivot pin 50 for the upper force transmitting member or lever 47 has its axis in axial alignment with the axis of the wheel cylinder. The pivot pin 50 is therefore formed with the diametral opening 64 and the hub 49 is formed with the diametrically opposite elongated openings 65 for the passage of the rod element 62. The backing plate 52 is mounted on the fixed flange 53 of the axle housing and has its central portion provided with the annular series of arcuate openings 66 through which extend the bolts 67 secured to the fixed flange 53 whereby the backing plate may rotate in either direction from its normal position. The backing plate also has the diametrically opposite arms 68 and 69 to which are secured the studs 70 which extend into the lever members 47 and 48 between their radially spaced projections or cams 55 and 56. These studs are engageable with the concave bearings 71 at the ends of the radial flanges or webs of the shoes between the bearings 57 and 58 so that upon operation of the brake the shoes move the studs and thereby swing or rotate the backing plate. To facilitate movement of the shoes, the piston rod element 62 is formed of the two rods 72 and 73 having the abutting rounded heads 74 slidably fitting the wall of the opening 64 so that the rods may readily assume various angular positions as the shoes move.

As illustrated in Figure 11, the construction of brake is substantially the same as that illustrated in Figures 7 to 10 inclusive but differs essentially in forming the radially inner transverse projection or cam 75 of each lever 76 with the radially outwardly diverging faces 77 for engagement by the radially inner faces 78 at the adjacent ends of the shoes. By reason of the radially outward divergence, tendency of the adjacent end portions of the shoes to move radially outwardly into wedging engagement with the brake flange of the brake drum is eliminated upon turning of the levers.

The brake illustrated in Figures 12 and 13 differs essentially from that illustrated in Figure 11 in forming the radially inner part of the hub 79 of the lever 80 adjacent the wheel cylinder 81 with the recess 82 for the passage of the piston rod 83 of the wheel cylinder, the piston rod in this instance extending below the pivot pin of the lever.

What I claim as my invention is:

1. A brake comprising a brake drum, a fixed mounting, a pair of brake shoes within and engageable with said drum and having pairs of adjacent shoe ends, a lever between and engaging each pair of adjacent shoe ends, pivot means fixed on said mounting radially inwardly of the points of engagement of said levers with said shoe ends and pivotally mounting said levers, said levers transmitting force from each shoe to the other shoe and spreading said adjacent shoe ends progressively farther apart upon angular movement of said levers, said levers and fixed pivot means cooperating with said drum and shoes to anchor said shoes, and an actuator comprising a wheel cylinder carried by said shoes independently of said levers for engaging said shoes with said drum.

2. A brake comprising a brake drum, a fixed mounting, friction elements within said drum and having pairs of adjacent ends, a lever between each pair of adjacent ends, fulcrum means fixed on said mounting on which said levers are respectively fulcrumed, said levers transmitting force from each of said friction elements to the other and spreading said adjacent ends progressively farther apart upon angular movement of said levers, said levers and fulcrum means cooperating with said drum and friction elements to anchor said friction elements, and an actuating device separate from said levers for engaging said friction elements with said drum.

3. A brake comprising a brake drum, a fixed mounting, brake shoes within and engageable with said drum and having pairs of adjacent shoe ends, means for spreading each pair of said ends apart to engage said brake shoes with said drum, each of said spreading means having a part extending chordwise of said drum, a force transmitting lever between and engaging each pair of adjacent shoe ends, pivot means fixed on said mounting radially inwardly of the points of engagement of said levers with said shoe ends and pivotally mounting said levers, said levers extending transversely of said spreading means and transmitting force from each of said shoes to the other of said shoes and spreading said adjacent ends progressively farther apart upon angular movement of said levers, said levers and fixed pivot means cooperating with said drum and shoes to anchor said shoes.

4. A brake comprising a brake drum, a fixed mounting, brake shoes within and engageable with said drum and having pairs of adjacent ends, means for spreading certain of said ends apart to engage said brake shoes with said drum, a force transmitting lever extending between each pair of adjacent ends and engageable with the ends of each pair at different distances from the axis of the drum, fulcrum means fixed on said mounting on which said levers are respectively fulcrumed, said levers transmitting force from each of said shoes to the other of said shoes and spreading said adjacent ends progressively farther apart upon angular movement of said levers, said levers and fulcrum means cooperating with said drum and shoes to anchor said shoes.

5. A brake comprising a brake drum, a fixed mounting, a pair of brake shoes within and engageable with said drum and having pairs of adjacent shoe ends, a lever between and engaging each pair of adjacent shoe ends, pivot means fixed on said mounting radially inwardly of the points of engagement of said levers with said shoe ends and pivotally mounting said levers, said levers transmitting force from each shoe to the other shoe and spreading said adjacent shoe ends progressively farther apart upon angular movement of said levers, said levers and fixed pivot means cooperating with said drum and shoes to anchor said shoes, an actuator for applying said shoes to said drum, one of said pivot means having an opening therethrough, and said actuator having a part extending through said opening.

References Cited in the file of this patent

UNITED STATES PATENTS

| | | |
|---|---|---|
| 1,773,755 | Sanford | Aug. 26, 1930 |
| 1,907,983 | Kohr et al. | May 9, 1933 |
| 2,057,724 | LaBrie | Oct. 20, 1936 |
| 2,081,521 | White | May 25, 1937 |
| 2,087,271 | Chambers | July 20, 1937 |
| 2,120,917 | Hause | June 14, 1938 |
| 2,122,296 | Russell | June 28, 1938 |
| 2,138,205 | Rasmussen et al. | Nov. 29, 1938 |
| 2,355,827 | Stelzer | Aug. 15, 1944 |
| 2,541,445 | Titus | Feb. 13, 1951 |
| 2,609,066 | Ross | Sept. 2, 1952 |
| 2,657,768 | Hunyady | Nov. 3, 1953 |